(12) United States Patent
Protasov et al.

(10) Patent No.: US 10,528,433 B2
(45) Date of Patent: Jan. 7, 2020

(54) SYSTEMS AND METHODS FOR DISASTER RECOVERY USING A CLOUD-BASED DATA CENTER

(71) Applicant: Acronis International GmbH, Schaffhausen (CH)

(72) Inventors: Stanislav Protasov, Moscow (RU); Serguei M Beloussov, Costa Del Sol (SG); Mark Shmulevich, Moscow (RU); Mikhail Kochegarov, Moscow (RU); Alexey Danilov, Moscow (RU)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 277 days.

(21) Appl. No.: 15/477,320

(22) Filed: Apr. 3, 2017

(65) Prior Publication Data

US 2017/0286236 A1     Oct. 5, 2017

Related U.S. Application Data

(60) Provisional application No. 62/316,668, filed on Apr. 1, 2016.

(51) Int. Cl.
| | | |
|---|---|---|
| *G06F 11/14* | (2006.01) | |
| *G06F 16/27* | (2019.01) | |
| *H04L 29/06* | (2006.01) | |
| *H04L 12/24* | (2006.01) | |
| *H04L 12/46* | (2006.01) | |

(52) U.S. Cl.
CPC ......... *G06F 11/1464* (2013.01); *G06F 16/27* (2019.01); *H04L 12/4641* (2013.01); *H04L 41/08* (2013.01); *H04L 63/0272* (2013.01); *G06F 2201/84* (2013.01)

(58) Field of Classification Search
CPC .... G06F 11/1464; G06F 16/27; G06F 16/184; G06F 2201/84; H04L 12/4641; H04L 41/0663; H04L 41/08; H04L 63/0272; H04L 67/1095; H04L 69/40
USPC ......................................................... 707/620
See application file for complete search history.

(56) References Cited

U.S. PATENT DOCUMENTS

| | | | | |
|---|---|---|---|---|
| 9,477,555 | B1* | 10/2016 | Hagan | G06F 16/2453 |
| 2012/0243410 | A1* | 9/2012 | Vedula | H04L 41/5025 |
| | | | | 370/235 |
| 2013/0212422 | A1* | 8/2013 | Bauer | H04L 67/1097 |
| | | | | 714/4.1 |
| 2016/0232061 | A1* | 8/2016 | Gaschler | G06F 16/27 |
| 2016/0274982 | A1* | 9/2016 | Lad | G06F 11/1458 |
| 2016/0323145 | A1* | 11/2016 | Anderson | H04L 67/1002 |
| 2017/0249221 | A1* | 8/2017 | Jain | G06F 11/2028 |
| 2018/0018237 | A1* | 1/2018 | Morita | G06F 11/1461 |

(Continued)

*Primary Examiner* — Robert W Beausoliel, Jr.
*Assistant Examiner* — Arthur Ganger
(74) *Attorney, Agent, or Firm* — Arent Fox LLP; Michael Fainberg

(57) ABSTRACT

A cloud-based disaster recovery service solution is provided. The disaster recovery provides cloud-based backup services that maintain local and off-site backups that may be activated on demand for backup purposes, or for full-site disaster recovery. The cloud-based data center may be configured to perform this backup and recovery process in a secure way, while protecting individual client environments from each other, and protecting the backup and recovery operations environment from the individual client environments.

20 Claims, 5 Drawing Sheets

(56) References Cited

U.S. PATENT DOCUMENTS

2018/0217903 A1* 8/2018 Wu ..................... H04L 43/0852
2018/0285202 A1* 10/2018 Bhagi ................. G06F 11/1464

* cited by examiner

SYSTEMS AND METHODS FOR DISASTER RECOVERY USING A CLOUD-BASED DATA CENTER

CROSS-REFERENCE TO RELATED APPLICATIONS

This application claims priority to U.S. Patent Application No. 62/316,668, which was filed on Apr. 1, 2016, the contents of which is incorporated herein by reference in its entirety.

TECHNICAL FIELD

The present disclosure generally relates to systems and methods for data backup and recovery, and in particular, to systems and methods for backup and recovery of an enterprise infrastructure in the event of a disaster using a cloud-based data center.

BACKGROUND

The modern trends towards using extensive networks connecting multiple servers which store and exchange large volumes of data on-site for enterprise clients raises many logistical issues, including the issue of efficient recovery in cases of disasters such as fires, earthquakes or floods that destroy the physical infrastructure of the enterprise client (e.g., networking infrastructure). This issue is not adequately addressed by existing disaster recovery services, which typically only backup clients' data. However, restoration of a physical network infrastructure of an enterprise client can take from weeks to months because the actual network and servers configuration is not adequately backed up and replicated. Conventional disaster recovery systems often do not replicate the entire client infrastructure including the network configurations, servers' configurations, routers, firewalls and order of servers' recovery and etc.

In view of the complexity of enterprise-level network infrastructure, and the likely loss of productivity and revenue when such systems are down or in the process of being restored, network infrastructure can be viewed as critical for business continuity and competitiveness in the event of a disaster. However, current methods are inadequate in that they typically focus on data recover while ignoring or inadequately addressing the need for full-featured backup options targeted towards network infrastructure.

In view of these shortcomings, there exists a need for efficient methods and a data centers for disaster recovery of an enterprise infrastructure, and in particular for cloud-based methods and systems.

SUMMARY

Accordingly, the present disclosure is directed to methods and systems for disaster recovery of an enterprise infrastructure from a cloud that substantially obviate one or more of the disadvantages of the related art.

In one exemplary aspect, a cloud-based disaster recovery service solution is provided. In this and other exemplary aspects, the disaster recovery service comprises a cloud-based backup service that maintain local and/or off-site backups that may be activated on demand for backup purposes, or for full-site disaster recovery. This service may also allow individual client hosts to be activated on a test basis in the cloud, to perform system and application verification, or for access to historical data sets. The cloud-based data center may perform these functions in a secure way, while protecting individual client environments from each other, and protecting the backup and recovery operations environment from individual client environments.

In another exemplary aspect, a method for replicating and restoring a client's network infrastructure is provided, including: determining a client's network configurations; creating a backup of at least one of the client's databases; identifying at least one physical or virtual server within the client's network infrastructure; defining a recovery point objective (RPO) and a recovery time objective (RTO), wherein the RPO indicates a time-point of a latest backup and replication prior to a disaster and the RTO indicates a time-point when the client's infrastructure is to be restored from the client's personal cloud after the disaster; allocating a client's personal cloud at a cloud-based data center; backing up the client's databases to the client's personal cloud; and replicating the previously identified physical or virtual servers, and the client's network configurations, on the client's personal cloud; wherein the disaster comprises an event that results in the physical destruction or inoperability of at least a portion of the client's network infrastructure.

In some exemplary aspects, the method further includes a) in response to an occurrence of the disaster associated with the RPO and RTO, restoring the client's replicated infrastructure at the RTO time-point; or b) restoring the client's replicated infrastructure prior to the RTO in response to a request from the client for a manual restoration.

In some exemplary aspects, the method further includes a) identifying client data on the identified at least one physical or virtual server; and b) replicating the client data on the client's personal cloud.

In some exemplary aspects, the replication of the client's network configurations comprise replication of one or more of the following: a) server connections of the one or more identified servers; b) an order of activation of the one or more identified servers; c) at least one router's configuration; d) at least one spam filter; and e) at least one hardware or virtual firewall.

In some exemplary aspects, the method further includes replicating an order of recovery of the one or more identified servers.

In some exemplary aspects, the method further includes defining at least one additional pair of RPO and RTO parameters, wherein each pair of RPO and RTO parameters is associated with a different type of disaster.

In some exemplary aspects, the method further includes creating a virtual private network (VPN) between the client's network infrastructure and the client's personal cloud.

In some exemplary aspects, the method further includes using the VPN for the backup and replication of the client's network infrastructure, and optionally for backup and replication of client data on the one or more identified servers.

In another exemplary aspect, a system for replicating and restoring a client's network infrastructure is provided, including: a cloud-based data center; and a processor configured to: determine a client's network configurations; create a backup of at least one of the client's databases; identify at least one physical or virtual server within the client's network infrastructure; define a recovery point objective (RPO) and a recovery time objective (RTO), wherein the RPO indicates a time-point of a latest backup and replication prior to a disaster and the RTO indicates a time-point when the client's infrastructure is to be restored from the client's personal cloud after the disaster; allocate a client's personal cloud at a cloud-based data center; back up the client's databases to the client's personal cloud; and replicate the previously identified physical or virtual servers, and the client's network configurations, on the client's personal cloud; wherein the disaster comprises an event that results in the physical destruction or inoperability of at least a portion of the client's network infrastructure.

In some exemplary aspects, the system includes a processor configured to perform any of the methods disclosed herein.

In another exemplary aspect, a non-transitory computer readable medium is provided for replicating and restoring a client's network infrastructure that includes computer-executable instructions for performing any of the methods disclosed herein.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

DETAILED DESCRIPTION

Figure 1:
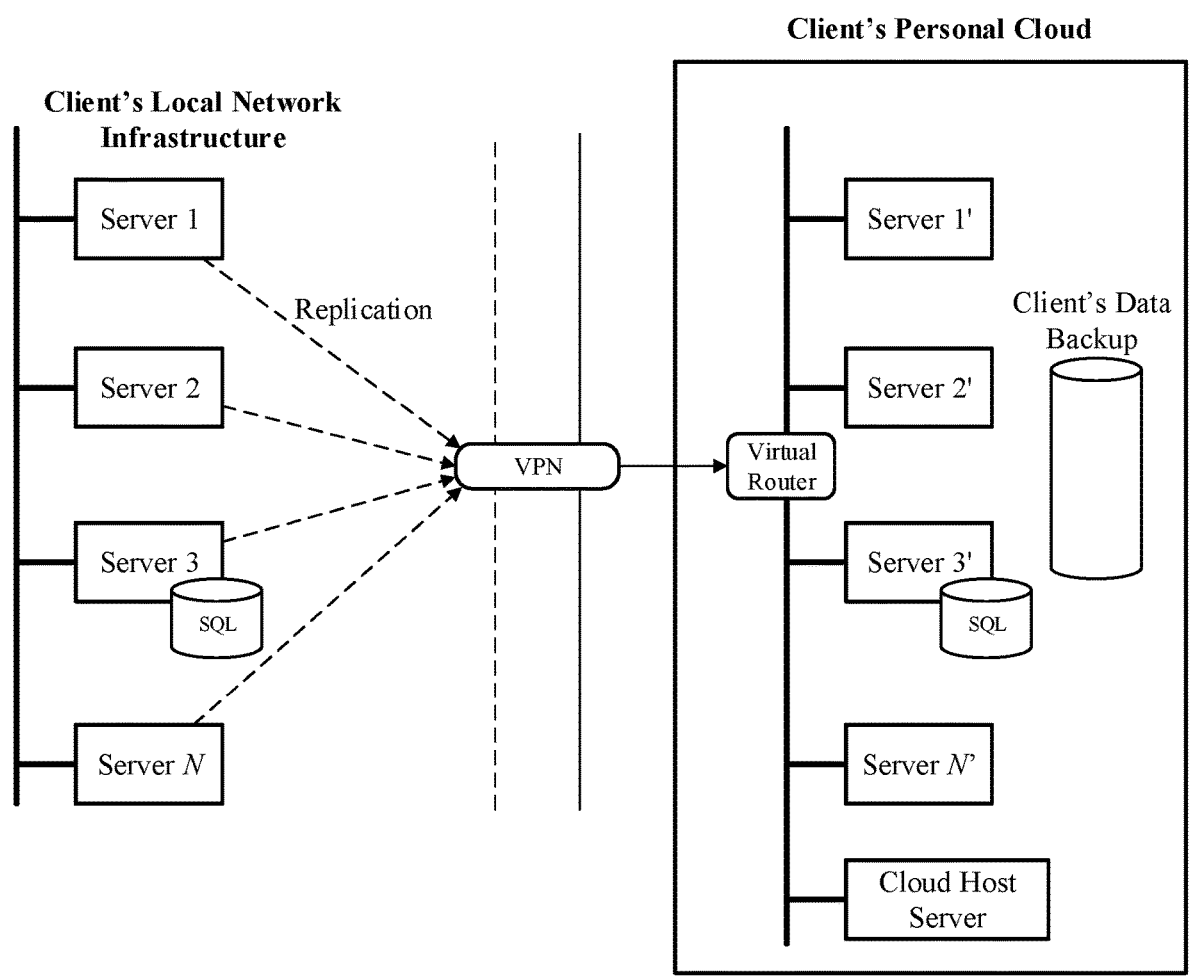
FIG. 1 is a block diagram that illustrates a disaster recovery architecture using a client's personal cloud, in accordance with an exemplary aspect of the disclosure.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

In one exemplary aspect of the disclosure, a cloud-based disaster recovery service solution is provided. The disaster recovery may provide cloud-based backup services that maintain local and off-site backups that may be activated on demand for backup purposes, or for full-site disaster recovery. This service may also allow individual client hosts to be activated on a test basis in the cloud, to perform system and application verification, or for access to historical data sets. The cloud-based data center performs this in a secure way, while protecting individual client environments from each other, and protecting the backup and recovery operations environment from individual client environments. In many of the exemplary aspects disclosed herein, the data center is identified as a cloud-based data center. However, in the interests of clarity it is understood that any data center suitable for performing the methods disclosed herein may be used regardless of whether it is cloud-based or not. The choice of data center type may vary based upon the needs of a given implementation.

Enterprise client networks can be quite simple, consisting of a single site, subnet, and Active Directory (AD) domain, or they can be quite complex, involving multiple sites, subnets and AD domains. Most of the clients depend on WINDOWS™ networking, and the disaster recovery solution provides a WINDOWS™-centric network model in the cloud. The disaster recovery solution supports connecting each client to multiple sites, providing multiple subnets in the cloud with distinct IP traffic profiles, and supporting multiple AD domains.

According to an exemplary aspect of the disclosure, clients can activate protected servers in the cloud environment and access those servers from their corporate LAN environment, with the ability to activate and reach those services in the event of a disaster or outage at their corporate site. A key advantage to the proposed disaster recovery solution is that it allows the client to perform test activations of individual servers and services, ensuring that those services will be available in the event of an actual disaster event or other outage.

According to the exemplary aspect, each client's data may be protected to an individual recovery data center—e.g., a dedicated sub-cloud within a large cloud. In this data center, a number of resources are dedicated to the client's use. System cores and active RAM are reserved for each enterprise client, based upon the number of servers they have chosen to replicate to the cloud, and any additional resource reservations they have requested to support demanding services, such as Microsoft Exchange or SQL servers.

Each client may be assigned a private virtual router, dedicated to providing the connection between their corporate site and the remote disaster recovery data center, and which may be configured to perform various additional traffic filtering and management functions. In some exemplary aspects, all network routing, filtering, and NAT functions that serve that client are performed by their dedicated virtual router.

According to some exemplary aspects, each client may be assigned two dedicated subnets, using addressing in RFC 1918 private IP network address space. In such configurations, the first of these subnets may be used for production activation of protected servers, including any always-on servers that are deployed to the cloud. Storage servers that reside in the cloud and store client backup data from the client's corporate LAN may be connected to this subnet. The second dedicated subnet may be used to perform activation tests, so that servers may be activated from a backup image and accessed by the client directly, without conflicting with the running server attached to the client's corporate LAN.

The client' production network in a datacenter may be unique to the particular datacenter—e.g., all clients may have non-overlapping networks in the datacenter. Note that the client's local network does not need to be the same as the client's cloud network. A virtual router (deployed in the cloud for each client) may perform NAT (address translation) between them.

In some exemplary aspects, the disaster recovery system may maintains a master list of these network assignments. The cloud subnets assigned to a client act as a branch office of the client's corporate network. The clients typically have to perform the same network filtering between the cloud subnets that have been dedicated to them and their corporate LAN that they would perform between their corporate LAN and the branch office. This means that there is typically no network traffic filtering between a client's LAN and that client's production cloud subnet. According to some exemplary aspects, each client can have several production and test subnets in the cloud (e.g., clients may be allotted up to 9 in total).

In some exemplary aspects, a dedicated virtual router can support up to four pairs of client cloud subnets. Each client subnet may be assigned a dedicated VLAN, to provide layer 2 isolation of network traffic between clients and between test and production subnets.

The client's cloud test subnet may be isolated from both the client's production cloud network and their corporate LAN, so that virtual machines that are activated and attached to the test network may be logged into and services may be tested, but will not impact the client's production operations. More precisely, ICMP traffic (ping), SSH, and RDP may be allowed between test systems and the corporate LAN/production cloud, but other traffic is blocked. This traffic filtering may be performed by the client's dedicated virtual router. If a client wishes to perform testing that requires additional ports and protocols to be allowed between the test network and their production environment, a disaster recovery support and operations team can make special arrangements to support that request. In particular, the disaster recovery support and the operations team may provide a custom configuration of the client's virtual router.

According to some exemplary aspects, each private virtual router may be assigned a single public IP address, which is used as an endpoint for that client's IPSec sessions. Traffic going to the Internet from a client's private networks may be address-translated to this public IP address. If a client needs dedicated inbound addresses (for example, to support a public Exchange server), they may be assigned to the private virtual router and address-translated to the address of the client's virtual machine that is attached to their production network. In some exemplary aspects, no client's virtual machines are ever attached directly to the public Internet.

An Active Directory Domain Controller may be deployed to the production subnet in the cloud. This Domain Controller may be used to provide user authentication and name resolution services to virtual machines activated in the cloud. This requires that the clients add the production cloud and sandbox subnets to their AD sites and services, so that client's virtual machines and WINDOWS™ firewall recognize the production network as an authorized network when they are activated in the cloud.

According to some exemplary aspects, the disaster recovery environment can support clients with multiple AD domains in the cloud so long as those domains share a mutual-trust relationship and the AD domain controller in the cloud can serve all of the client's domains. It is also possible to support multiple AD domains without mutual trust by deploying additional client subnets, but that requires support by professional services to deploy.

Clients require remote access to the disaster recovery cloud environment for their users during a disaster recovery event. Access can be provided (e.g., via a VPN service) such as either by an L2TP/IPSec VPN service provided by the dedicated virtual router, or by an OpenVPN SSL VPN virtual appliance, which may be deployed and managed by the disaster recovery system and dedicated to the individual client. In either case, the VPN service may use the client's AD domain controller in the cloud to perform user authentication.

In some exemplary aspects, if a client requires additional public addresses, for example for other Internet-facing services such as Citrix Terminal Services, the disaster recovery system may allocate these addresses and assign them to the private virtual router, which manages address translation to reach the virtual machine activated on the client's production or sandbox network. According to some exemplary aspects, the dedicated virtual router may have network interfaces on the public DMZ ("DeMilitarized Zone"—i.e., a dedicated network in a datacenter, which provides additional layer of security and customers' networks isolation) and on the client's cloud subnets. It may be configured not to run dynamic routing protocols, and to instead use static routes to reach the client's environment over IPSec or a client's dedicated circuit. The proposed disaster recovery operations network does not run dynamic routing protocols for RFC 1918 (private) networks, and does not have any network visibility to (or addressing awareness of) client corporate networks.

All interaction with client LANs may be performed via address translation into the client's cloud network address space, which may be performed by the client's dedicated virtual router. The disaster recovery operations network can initiate connections into each client's production cloud network. For Network Appliance (NetApp) clients, a dedicated storage subnet and VLAN are defined to support communication between the client's vFiler and ESX hosts in the disaster recovery data center. This subnet may be restricted to storage protocols, and configured not to permit terminal sessions or remote access traffic, and in some exemplary aspects is not routed to or interconnected with other networks in the data center.

According to some exemplary aspects, shared private storage subnets are also defined to provide high-performance storage access to client storage servers in the cloud by data center ESX hosts. These storage servers may be configured to discard traffic from inappropriate storage peers—in particular, client storage servers are configured not to accept or respond to traffic from each other. These storage networks are not routed to or interconnected with other networks in the data center, and are restricted to storage protocols. The ESX hosts attached to these networks are configured with host filters to discard non-storage protocols and traffic. Each client's data resides entirely in a single data center. The clients may be assigned to a data recovery site during implementation. According to some exemplary aspects, clients may be allowed to keep their data in different datacenters and all their servers can be managed from a single GUI (DR console).

The data recovery sites may be chosen to minimize network latency while ensuring that a client's data recovery site and corporate data sites are not within the same area of a disaster risk. Optionally, in some exemplary aspects client data is not backhauled between the data centers, and is not transported across national boundaries unless a client has explicitly requested that their data be stored in another jurisdiction. In some exemplary aspects, multiple data recovery sites may be selected either automatically or by the client in order to provide additional redundant backups.

According to some exemplary aspects, the disaster recovery sites may use carrier-independent addressing and can perform timely, carrier-independent failover and load-balancing between Internet carriers. Clients connecting to the data recovery sites via dedicated circuit technologies such as MPLS (Multi-Protocol Label Switching) do not normally connect via multiple carriers. The MPLS is an alternative to IPSec VPN method to connect client-side networks to the cloud-side networks, which requires client network equipment to be installed in the datacenter. Typically, this is a requirement from large enterprise customers, who already use MPLS technology to connect different internal offices.

A dynamically-routed public network segment may be present in each data center, as the border. Publicly reachable machines such as dedicated client routers and service addresses for public-facing client VMs may be assigned to this network, as are the service addresses for inbound operations remote access connections.

Note that while access to this network from the Internet may be filtered in some exemplary aspects, in some configurations no hosts are directly attached other than routing and security appliances and hardened service systems. All internal operations hosts and client VMs may be attached to private RFC 1918 space networks, and NAT may be used to allow them to reach the Internet. In these configurations, the operations hosts are therefore translated to the public interface of the border router, and client VMs are NAT-connected to either the public address of their dedicated virtual router or to assigned public service addresses that are explicitly mapped for the specified VM.

The public network segment in each multi-carrier data center may be dynamically routed and advertised to each connected carrier. The private networks may use static routing internally with the default route assigned to the southbound router interface on each network segment. There is at least one special case involving slightly more complex static routing in the dedicated circuit (i.e., MPLS) client interconnection case, but static routing may generally be used for all internal, RFC 1918 networks. Client cloud network segments may be reachable from each production data recovery site by an inter-site VPN tunneling. This is intended to support cross-data-center monitoring and redundant access to the data centers. Static routes are defined in each border router for each subnet at a remote site.

One of the most important security concern with the disaster recovery service is providing system and network isolation to clients from each other, so that the clients' networks are protected from malware and security events on other clients' networks. It is also important to secure the clients' data as it is transmitted between each client's site(s) and the recovery data center where their disaster recovery services are provided. Accordingly, in some exemplary aspects the data center operations networks are isolated from the recovery service provider corporate network, and client's networks are not reachable from the recovery service provider corporate network. Client networks may be indirectly reachable from the recovery service provider operations network, via the address translation scheme described above.

According to some exemplary aspects, the disaster recovery system filters all inbound traffic to each disaster recovery data center so that only expressly-permitted traffic is allowed onto the public and private network segments. The following protocols may be implemented:

1. Secure management traffic between recovery data centers;
2. IPsec traffic to dedicated client virtual routers;
3. Responses to network sessions initiated by a client and operations VMs attached to private networks at the data center; and
4. Expressly permitted inbound traffic—e.g., public SMTP traffic between Mimecast and individual public addresses assigned to client VMs deployed to provide services to the Internet.

Client data from multiple tenants may be stored on the underlying storage networks and accessed by the underlying ESX environments. This access may be mediated and controlled by a proprietary disaster recovery solution component called PodManager from ACRONIS® and other operations automation software, so that client systems are not attached or exposed to other clients or to disaster recovery staff.

FIG. 1 illustrates a disaster recovery architecture using a client's personal cloud, in accordance with an exemplary aspect. A local client has a network of servers from 1 to N. At least one of these servers has a local client database—e.g., a backup archive or a backup node.

A client's personal disaster recovery cloud is allocated on the cloud-based data center. Client's data is backed up onto the local client's backup archive, which in turn, may be continuously replicated to the client cloud archive, located in the client's personal disaster recovery cloud. Then, the servers may be replicated onto the client's personal disaster recovery cloud (e.g., as VMs connected into a virtual network using a virtual router).

The replication process typically includes all client servers' configurations. In some exemplary aspects, the network configuration is not replicated, instead during an on-boarding procedure the client cloud network configuration may be generated (in a semi-automated manner). Typically, the client cloud network has a simpler topology in comparison to the original client infrastructure.

The services' recovery order is typically not replicated either, though replication of this parameter is possible. It may be configured in the "Runbook" during the client on boarding procedure. For example, if server 3 runs a database it should be recovered first before other servers that use the data. A mail server may have to be recovered second, etc. In other words, the entire client infrastructure may be replicated on the personal cloud. Note that a special personal cloud or a sub-cloud within the personal cloud can be allocated for disaster recovery testing. The client may connect to its personal cloud over a VPN.

Figure 2:
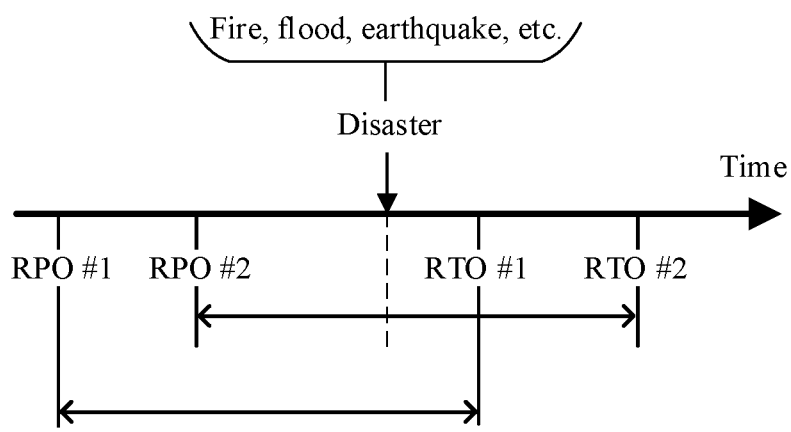
FIG. 2 illustrates two pairs of recovery point objective (RPO) and recovery time objective (RTO) settings in accordance with the exemplary aspect of the disclosure.

FIG. 2 illustrates recovery point objective (RPO) and recovery time objective (RTO) settings. The RPO parameter indicates the last time-point of the backup prior to the disaster. The RTO indicates the time-point when client's infrastructure is to be restored and properly started (activated) from the backup. According to some exemplary aspects, the time period between the RPO and the disaster is, typically, set at about an hour or less, though a client may configure it to a value most suitable for his or her business needs.

As shown by this figure, a plurality of RPO and RTO parameters may be set to account for various potential disasters conditions (e.g., a different pair of RPO and RTO parameters may be used for a fire versus for a flood). A disaster may include a natural disaster or a disaster resulting from the action or negligence of a human actor (e.g., a fire caused by an employee of the client may render some or all of the local network infrastructure inoperable or destroyed). RPO and RTO parameters may also be configured to be associated with a given severity level of a disaster (e.g., the time-points for recovery may be set to different levels depending on whether some, all, or a given threshold of the network infrastructure is destroyed or otherwise rendered inoperable by a disaster).

In some exemplary aspects, the time from the disaster to the RTO is kept under 10 minutes. This way, all of a client's configurations and data at the point of RPO is recovered within 10 minutes. According to some exemplary aspects, the client's disaster recovery infrastructure backup is not a mirror backup of the client's data and configurations. Instead, the client's infrastructure backup is a minimal data and network configurations necessary to start the infrastructure and recover its previous (i.e., RPO) state. Some client's infrastructure elements such as databases and VMs can be continuously replicated on the client's personal cloud (e.g., a dedicated portion of the datacenter).

Figure 3:
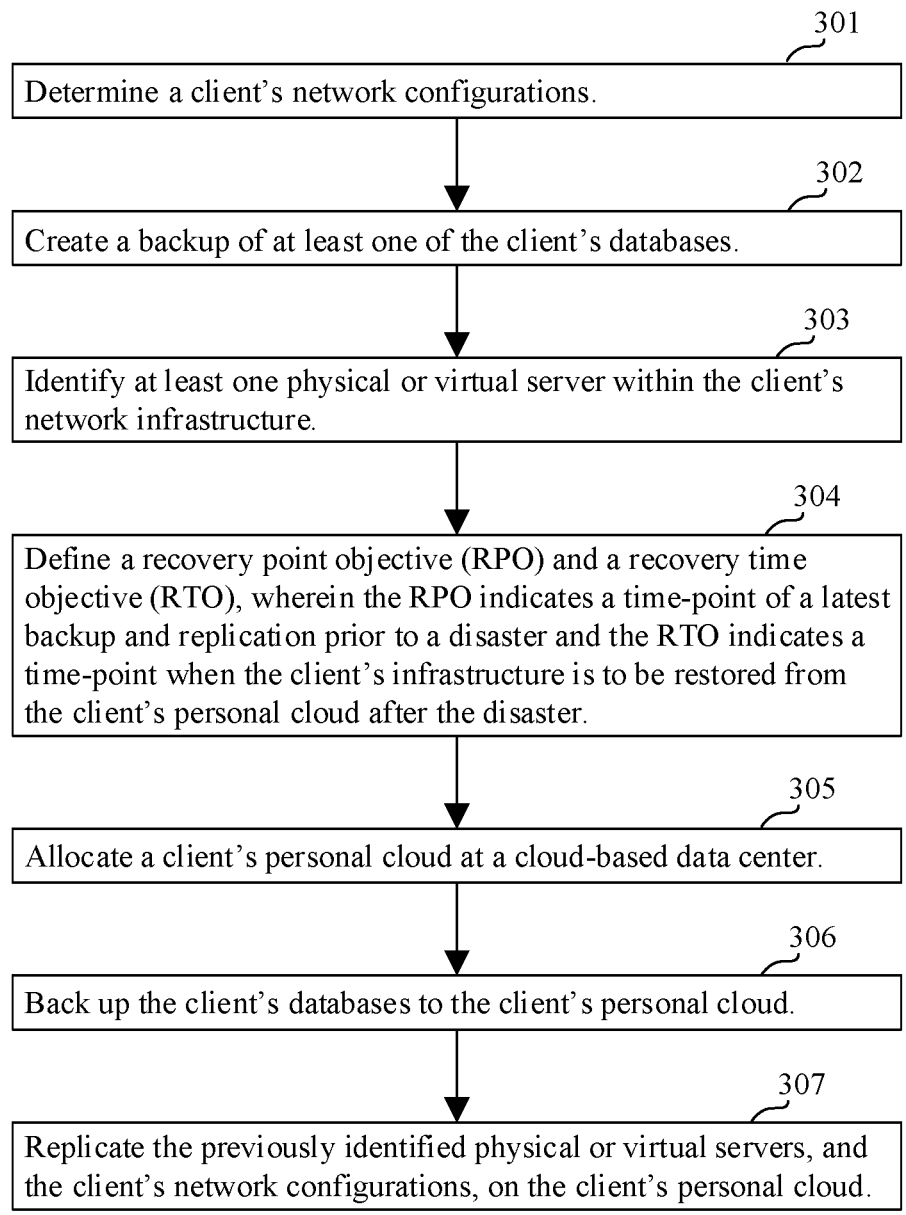
FIG. 3 is a flowchart illustrating a method for replicating and restoring a client's network infrastructure according to an exemplary aspect of the disclosure.

FIG. 3 is a flowchart illustrating a method for replicating and restoring a client's network infrastructure according to an exemplary aspect of the disclosure. As shown by this figure, an exemplary method according to the disclosure may begin by determining a client's network configurations and creating a backup of at least one of the client's databases. The method may proceed by identifying at least one physical or virtual server within the client's network infrastructure. To be clear, these steps may be carried out in any order as suited for a given implementation.

A recovery point objective (RPO) and a recovery time objective (RTO) may be defined, wherein the RPO indicates a time-point of a latest backup and replication prior to a disaster and the RTO indicates a time-point when the client's infrastructure is to be restored from the client's personal cloud after the disaster. Next, a client's personal cloud may be allocated at a cloud-based data center. The client's databases may then be backed up to the client's personal cloud and the previously identified physical or virtual servers, and the client's network configurations, may be replicated on the client's personal cloud.

In this exemplary aspect, a disaster may comprise an event that results in the physical destruction or inoperability of at least a portion of the client's network infrastructure. However, in this is a non-limiting definition. The term disaster may refer to other types of events which destroy or otherwise render inoperable some or all of the client's network infrastructure. In some exemplary aspects, the client may define or configure particular disaster settings for a given implementation.

Figure 4:
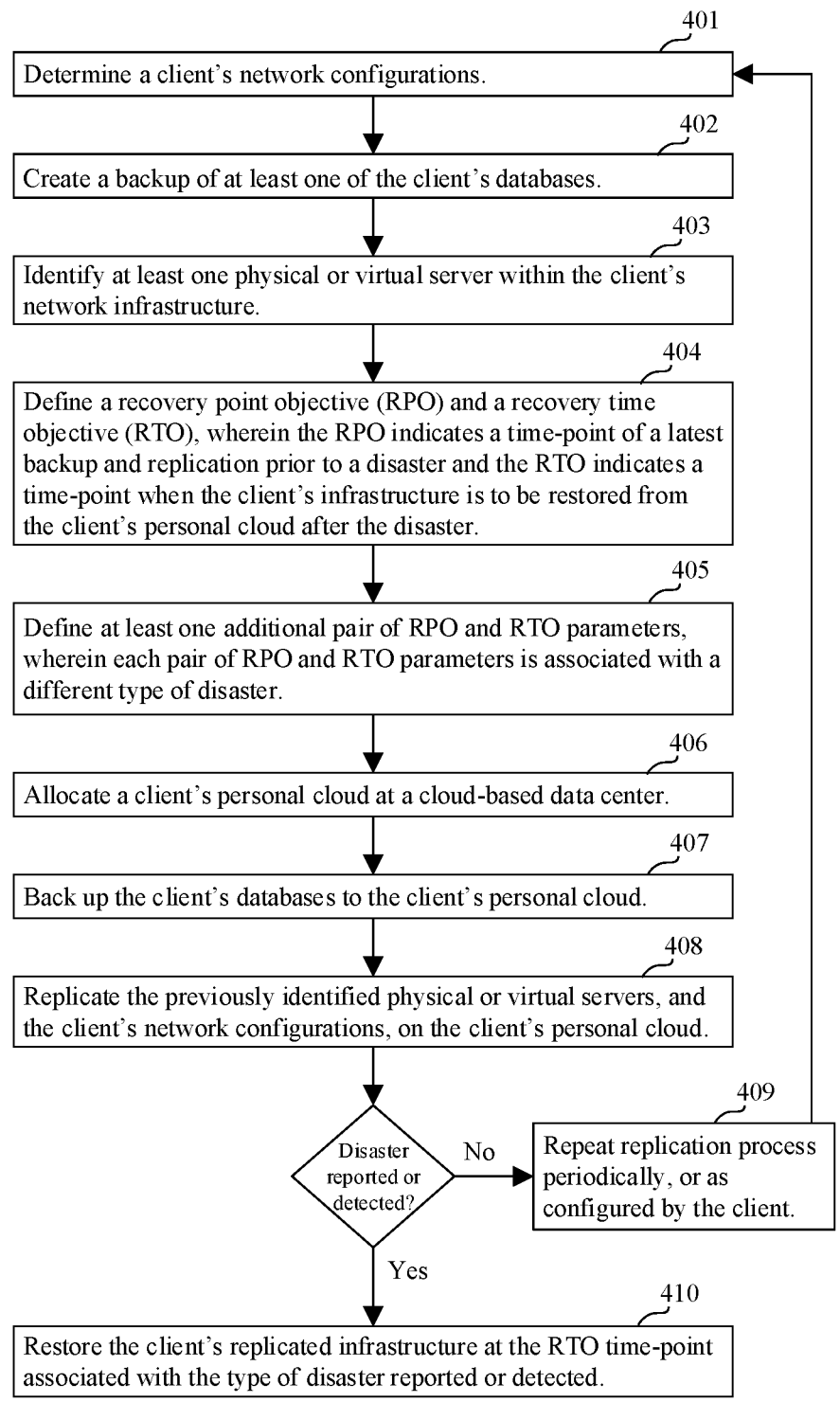
FIG. 4 is a flowchart illustrating another method for replicating and restoring a client's network infrastructure according to an exemplary aspect of the disclosure.

FIG. 4 is a flowchart illustrating another method for replicating and restoring a client's network infrastructure according to an exemplary aspect of the disclosure. As illustrated by this figure, in some exemplary aspects the recovery process may proceed by restoring a client's network infrastructure. For example, the client's replicated infrastructure at the RTO time-point may be used for restoration (e.g., at a new or backup location) in response to an occurrence of a disaster associated with a given RPO and RTO.

In other exemplary aspects, the restoration process may be triggered manually by a client request for a manual restoration. A manual request may result in a restoration prior to a pre-set RTO. Furthermore, as noted above a plurality of RPO and RTO setting may be configured to be triggered by different types of disaster conditions. In configurations where the restoration process is set to proceed automatically, the system may be configured to detect that a disaster has occurred (e.g., by a sensor or input from the client), and optionally to determine a type of disaster, and then to proceed with the restoration process parameters associated with a given disaster. The system may be configured to alternatively repeat or otherwise continue with a periodic replication process according to a preconfigured or other schedule if no disaster is detected.

Figure 5:
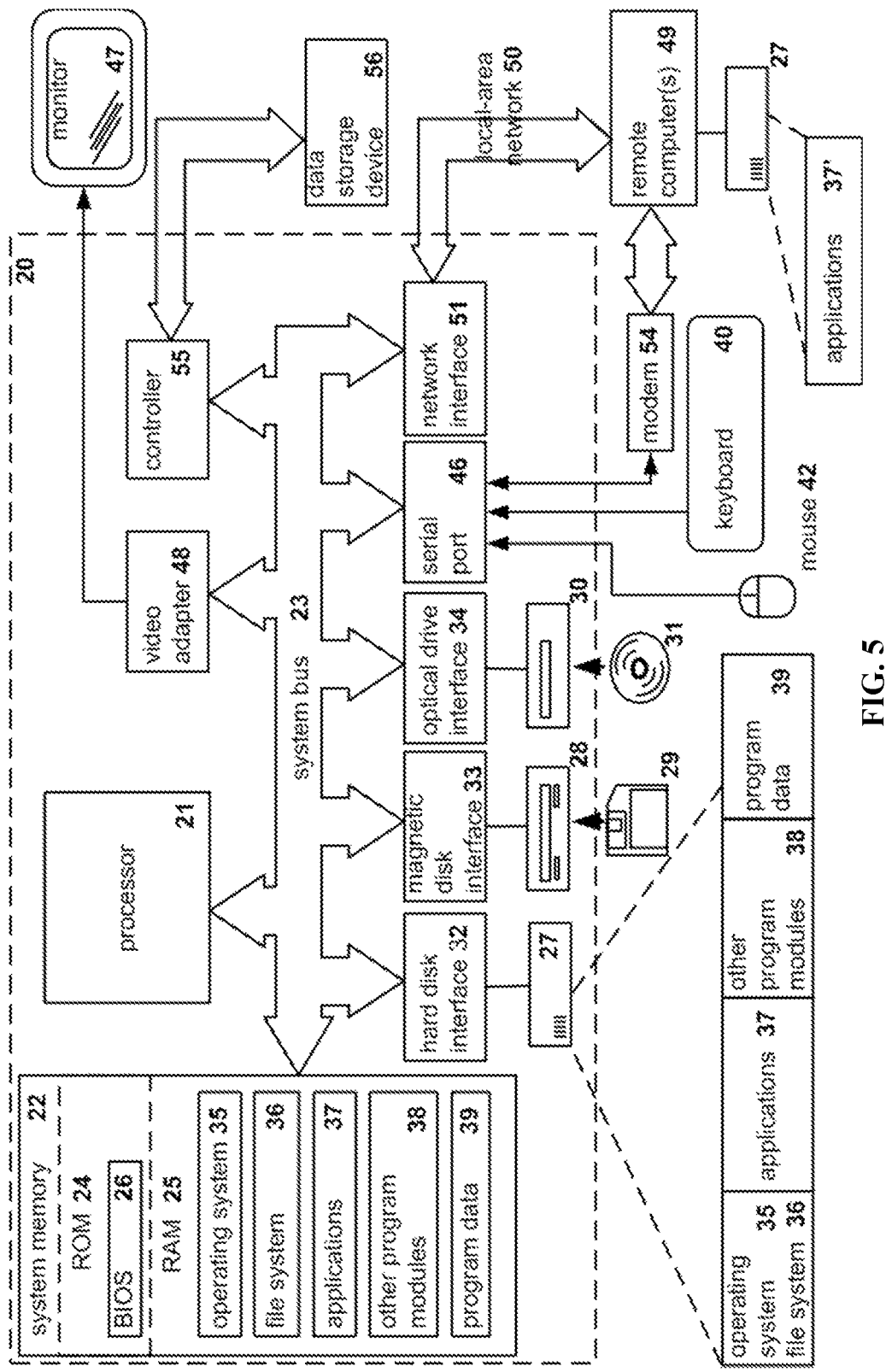
FIG. 5 illustrates a block diagram of an example of a general-purpose computer system on which the disclosed systems and methods can be implemented according to an exemplary aspect.

FIG. 5 illustrates a block diagram of an example of a general-purpose computer system on which the disclosed systems and methods can be implemented according to various exemplary aspects. More particularly, a general purpose computing device is provided in the form of a computer system 20 that illustrates exemplary components that can be provided for a computing device, such as mobile device or server. As shown, the computer system 20 can include a processing unit 21, a system memory 22, and a system bus 23 that couples various system components including the system memory to the processing unit 21. It should be appreciated that processing unit 21 can correspond to CPU 210, for example.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like, provided for receiving speech based commands, for example.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, such as computing device 120, a server, a router, a network PC, a peer device or other common network node, and typically includes many or all of the elements described above relative to the computer 20. The logical connections include a network interface 51 and a wide area network (WAN). Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. One or more of the above-noted components can correspond to I/O interface 220 according to an exemplary aspect.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for replicating and restoring a client's network infrastructure, comprising:
   determining a client's network configurations;
   creating a backup of at least one of the client's databases;
   identifying at least one physical or virtual server within the client's network infrastructure;
   defining at least one pair of a recovery point objective (RPO) and a recovery time objective (RTO) parameters, wherein, the pair of parameters is defined for a type of disaster, the RPO indicates a time-point of a latest backup and replication prior to a disaster, and the RTO indicates a time-point when the client's infrastructure is to be restored from the client's personal cloud after the disaster;
   allocating a client's personal cloud at a cloud-based data center;
   backing up the client's databases to the client's personal cloud; and
   replicating the previously identified physical or virtual servers, and the client's network configurations, on the client's personal cloud,
   wherein the disaster comprises an event that results in the physical destruction or inoperability of at least a portion of the client's network infrastructure.

2. The method of claim 1, further comprising:
   a) in response to an occurrence of the disaster associated with the pair of RPO and RTO parameters, restoring the client's replicated infrastructure at the RTO time-point; or
   b) restoring the client's replicated infrastructure prior to the RTO in response to a request from the client for a manual restoration.

3. The method of claim 1, further comprising:
   a) identifying client data on the identified at least one physical or virtual server; and
   b) replicating the client data on the client's personal cloud.

4. The method of claim 1, wherein the replication of the client's network configurations comprise replication of one or more of the following:
   a) server connections of the one or more identified servers;
   b) an order of activation of the one or more identified servers;
   c) at least one router's configuration;
   d) at least one spam filter; and
   e) at least one hardware or virtual firewall.

5. The method of claim 4, further comprising: replicating an order of recovery of the one or more identified servers.

6. The method of claim 1, further comprising: defining at least one additional pair of RPO and RTO parameters, wherein each additional pair of RPO and RTO parameters is associated with a different type of disaster.

7. The method of claim 1, further comprising: creating a virtual private network (VPN) between the client's network infrastructure and the client's personal cloud.

8. The method of claim 7, further comprising: using the VPN for the backup and replication of the client's network infrastructure, and optionally for backup and replication of client data on the one or more identified servers.

9. A system for replicating and restoring a client's network infrastructure, comprising:
a cloud-based data center; and
a processor configured to:
determine a client's network configurations;
create a backup of at least one of the client's databases;
identify at least one physical or virtual server within the client's network infrastructure;
define at least one pair of a recovery point objective (RPO) and a recovery time objective (RTO) parameters, wherein, the pair of parameters is defined for a type of disaster, the RPO indicates a time-point of a latest backup and replication prior to a disaster and the RTO indicates a time-point when the client's infrastructure is to be restored from the client's personal cloud after the disaster;
allocate a client's personal cloud at a cloud-based data center;
back up the client's databases to the client's personal cloud; and
replicate the previously identified physical or virtual servers, and the client's network configurations, on the client's personal cloud,
wherein the disaster comprises an event that results in the physical destruction or inoperability of at least a portion of the client's network infrastructure.

10. The system for replicating and restoring a client's network infrastructure of claim 9, wherein the processor is further configured to:
a) in response to an occurrence of the disaster associated with the pair of RPO and RTO parameters, restore the client's replicated infrastructure at the RTO time-point; or
b) restore the client's replicated infrastructure prior to the RTO in response to a request from the client for a manual restoration.

11. The system for replicating and restoring a client's network infrastructure of claim 9, wherein the processor is further configured to:
a) identify client data on the identified at least one physical or virtual server; and
b) replicate the client data on the client's personal cloud.

12. The system for replicating and restoring a client's network infrastructure of claim 9, wherein the replication of the client's network configurations comprise replication of one or more of the following:
a) server connections of the one or more identified servers;
b) an order of activation of the one or more identified servers;
c) at least one router's configuration;
d) at least one spam filter; and
e) at least one hardware or virtual firewall.

13. The system for replicating and restoring a client's network infrastructure of claim 12, wherein the processor is further configured to: replicate an order of recovery of the one or more identified servers.

14. The system for replicating and restoring a client's network infrastructure of claim 9, wherein the processor is further configured to: define at least one additional pair of RPO and RTO parameters, wherein each additional pair of RPO and RTO parameters is associated with a different type of disaster.

15. The system for replicating and restoring a client's network infrastructure of claim 9, wherein the processor is further configured to: create a virtual private network (VPN) between the client's network infrastructure and the client's personal cloud.

16. The system for replicating and restoring a client's network infrastructure of claim 15, wherein the processor is further configured to: use the VPN for the backup and replication of the client's network infrastructure, and optionally for backup and replication of client data on the one or more identified servers.

17. A non-transitory computer readable medium is provided for replicating and restoring a client's network infrastructure that comprises computer-executable instructions for:
determining a client's network configurations;
creating a backup of at least one of the client's databases;
identifying at least one physical or virtual server within the client's network infrastructure;
defining at least one pair of a recovery point objective (RPO) and a recovery time objective (RTO) parameters, wherein, the pair of parameters is defined for a type of disaster, the RPO indicates a time-point of a latest backup and replication prior to a disaster and the RTO indicates a time-point when the client's infrastructure is to be restored from the client's personal cloud after the disaster;
allocating a client's personal cloud at a cloud-based data center;
backing up the client's databases to the client's personal cloud; and
replicating the previously identified physical or virtual servers, and the client's network configurations, on the client's personal cloud,
wherein the disaster comprises an event that results in the physical destruction or inoperability of at least a portion of the client's network infrastructure.

18. The non-transitory computer readable medium of claim 17, further comprising computer-executable instructions for:
a) in response to an occurrence of the disaster associated with the pair of RPO and RTO parameters, restoring the client's replicated infrastructure at the RTO time-point; or
b) restoring the client's replicated infrastructure prior to the RTO in response to a request from the client for a manual restoration.

19. The non-transitory computer readable medium of claim 17, further comprising computer-executable instructions for:
a) identifying client data on the identified at least one physical or virtual server; and
b) replicating the client data on the client's personal cloud.

20. The non-transitory computer readable medium of claim 17, wherein the replication of the client's network configurations comprise replication of one or more of the following:
a) server connections of the one or more identified servers;
b) an order of activation of the one or more identified servers;
c) at least one router's configuration;
d) at least one spam filter; and
e) at least one hardware or virtual firewall.

* * * * *